United States Patent
Hartman

(10) Patent No.: US 10,868,637 B2
(45) Date of Patent: Dec. 15, 2020

(54) RETRANSMISSION OF AN UNEXECUTED MESSAGE

(71) Applicant: California Eastern Laboratories, Inc., Santa Clara, CA (US)

(72) Inventor: James Paul Hartman, Canton, GA (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 57 days.

(21) Appl. No.: 16/239,853

(22) Filed: Jan. 4, 2019

(65) Prior Publication Data
US 2020/0220660 A1 Jul. 9, 2020

(51) Int. Cl.
*H04L 1/08* (2006.01)
*H04L 12/18* (2006.01)
*H04L 12/28* (2006.01)

(52) U.S. Cl.
CPC ............ *H04L 1/08* (2013.01); *H04L 12/1845* (2013.01); *H04L 12/2816* (2013.01); *H04L 12/2823* (2013.01); *H04L 2012/285* (2013.01); *H04L 2012/2841* (2013.01)

(58) Field of Classification Search
CPC ... H04L 12/1881; H04L 1/1614; H04L 1/188; H04L 2001/0093; H04L 5/0055; H04L 1/1607; H04W 48/10; H04W 48/12; H04W 72/042
See application file for complete search history.

(56) References Cited

U.S. PATENT DOCUMENTS

| | | | |
|---|---|---|---|
| 10,637,681 B2* | 4/2020 | Brandt | H04W 24/00 |
| 2002/0045969 A1* | 4/2002 | Dierauer | B07C 5/00 700/223 |
| 2013/0006435 A1* | 1/2013 | Berrios | H02S 20/32 700/295 |
| 2013/0051250 A1* | 2/2013 | Shaffer | H04L 45/70 370/252 |
| 2013/0340015 A1* | 12/2013 | Magis | H04L 12/2812 725/82 |
| 2016/0277201 A1* | 9/2016 | Thubert | H04L 1/1614 |
| 2018/0219646 A1* | 8/2018 | Del Carpio Vega | H04W 72/042 |

* cited by examiner

*Primary Examiner* — Mewale A Ambaye
(74) *Attorney, Agent, or Firm* — Richard W. James

(57) ABSTRACT

A message retransmission apparatus, method, and system. The method includes transmission of a multicast message to a plurality of nodes by a network communication device, receipt by the network communication device of return status messages from the plurality of nodes during a predetermined period of time, and retransmission by the network communication device of the message that was multicast by unicast to at least one of the plurality of nodes, that node having provided a state that does not correspond with the command included in the multicast message.

20 Claims, 5 Drawing Sheets

RETRANSMISSION OF AN UNEXECUTED MESSAGE

BACKGROUND

Field of the Disclosure

The present disclosure generally relates to retransmission of an unactuated command over a local area network (LAN), and more particularly to transmission of a unicast message to an actuating device on the network that has not transmitted a confirming message that its actuator has been placed in a position requested in a multicast message.

Brief Description of Related Art

Computer automated control systems often send control messages across a network to actuate controlled apparatuses in those networks. Moreover, a large number of state and level change command messages are transmitted across such a network to a number of actuating devices, such as lighting fixtures to be energized or de-energized, brightened or dimmed. For example, if lights are to be energized or de-energized at a scheduled time or when a switch is actuated, an operational control message may be sent across the network to each lighting fixture or bank of fixtures that are controlled together to actuate the lights to be energized or de-energized. In a large building where many areas, such as lobbies and common areas, are to be lit at one particular time, many scheduled event control messages may be sent across the network at a time or during a short period of time.

When a large, wireless mesh-networked system is managed and controlled by, for example, a resource-limited, single flow embedded processing system, inefficiencies can arise that impact overall system performance and user experience.

Inefficiencies in such a system may occur when a large number of messages of a particular type are being sent over the network. When too many messages of a particular type are sent across the network, the network may become congested and operate inefficiently, message delivery may be delayed, network queues may overflow, and messages may be delayed or lost and may fail to be delivered by the network as required. In addition, users may experience delays or failures in system operation from their perspective.

There exists a layer of software in many networking systems that manages the transmission and receipt of messages. For example, a ZigBee or Bluetooth software stack is a layer of software that sends and receives messages, including unicast messages (directed to a single device) and multicast messages (directed to one or more devices that may each have a unique address and may all share a group destination address). Since multicast messages are generally sent to more than one device, it is common in a mesh network for a multicast packet to be retransmitted by multiple nodes to ensure all destination nodes in the system receive the packet. Having multiple nodes retransmit each multicast packet helps ensure that all destination devices in the multicast operation receive the multicast packet, but it also requires a great deal of network bandwidth.

Thus there is a need for systems, apparatuses, and methods to efficiently retransmit a multicast message that is not acted on by a networked device.

Embodiments of retransmission of an unexecuted message are apparatuses, systems, and methods that retransmit a message to a node that did not receive a multicast message and therefore did not appropriately act on that message.

Embodiments of retransmission of an unexecuted message are apparatuses, systems, and methods that transmit a unicast message to a node that received a multicast message but did not enter a state it was commanded to enter by the multicast message.

Embodiments of retransmission of an unexecuted message are apparatuses, systems, and methods that transmit a message to a node that does not report an expected status based on a previously transmitted message.

SUMMARY OF THE INVENTION

In one embodiment, the present disclosure contemplates a message retransmission apparatus. The message retransmission apparatus includes a network communication device for communicating data to a plurality of remote devices and a processor coupled to the network communication device. The processor includes instructions which, when executed by the processor, cause the processor to transmit a multicast message to a plurality of nodes, receive return messages from the plurality of nodes for a predetermined period of time, and retransmit the message that was multicast by a unicast message to at least one of the plurality of nodes, the retransmission containing at least a portion of the substantive content of the multicast message and being provided to a node that did not provide a state that corresponds with the command included in the multicast message.

In another embodiment, the present disclosure contemplates a message retransmission method that includes transmission of a multicast message to a plurality of nodes by a network communication device, receipt by the network communication device of return status messages from the plurality of nodes during a predetermined period of time, and retransmission by the network communication device of the message that was multicast by unicast to at least one of the plurality of nodes, that node having provide a state that does not correspond with the command included in the multicast message.

In yet another embodiment, the present disclosure contemplates an Internet of Things gateway that includes a network communication device for communicating data to a plurality of remote actuating devices that each actuate a building control device and a processor coupled to the network communication device. The processor includes instructions which, when executed by the processor, cause the processor to transmit a multicast message to at least some of the plurality of remote actuating devices, receive return status messages from the plurality of remote actuating devices during a predetermined period of time and retransmit the message that was multicast by unicast to at least one of the plurality of remote actuating devices, that remote actuating device having provided a status that does not correspond with a command included in the multicast message.

BRIEF DESCRIPTION OF THE DRAWINGS

For the present disclosure to be easily understood and readily practiced, the present disclosure will now be described for purposes of illustration and not limitation, in connection with the following figures.

The accompanying drawings, wherein like reference numerals are employed to designate like components, are included to provide a further understanding of the present inventions, are incorporated in and constitute a part of this specification, and show embodiments of those apparatuses and methods that together with the description serve to explain those apparatuses and methods.

Figure 1:
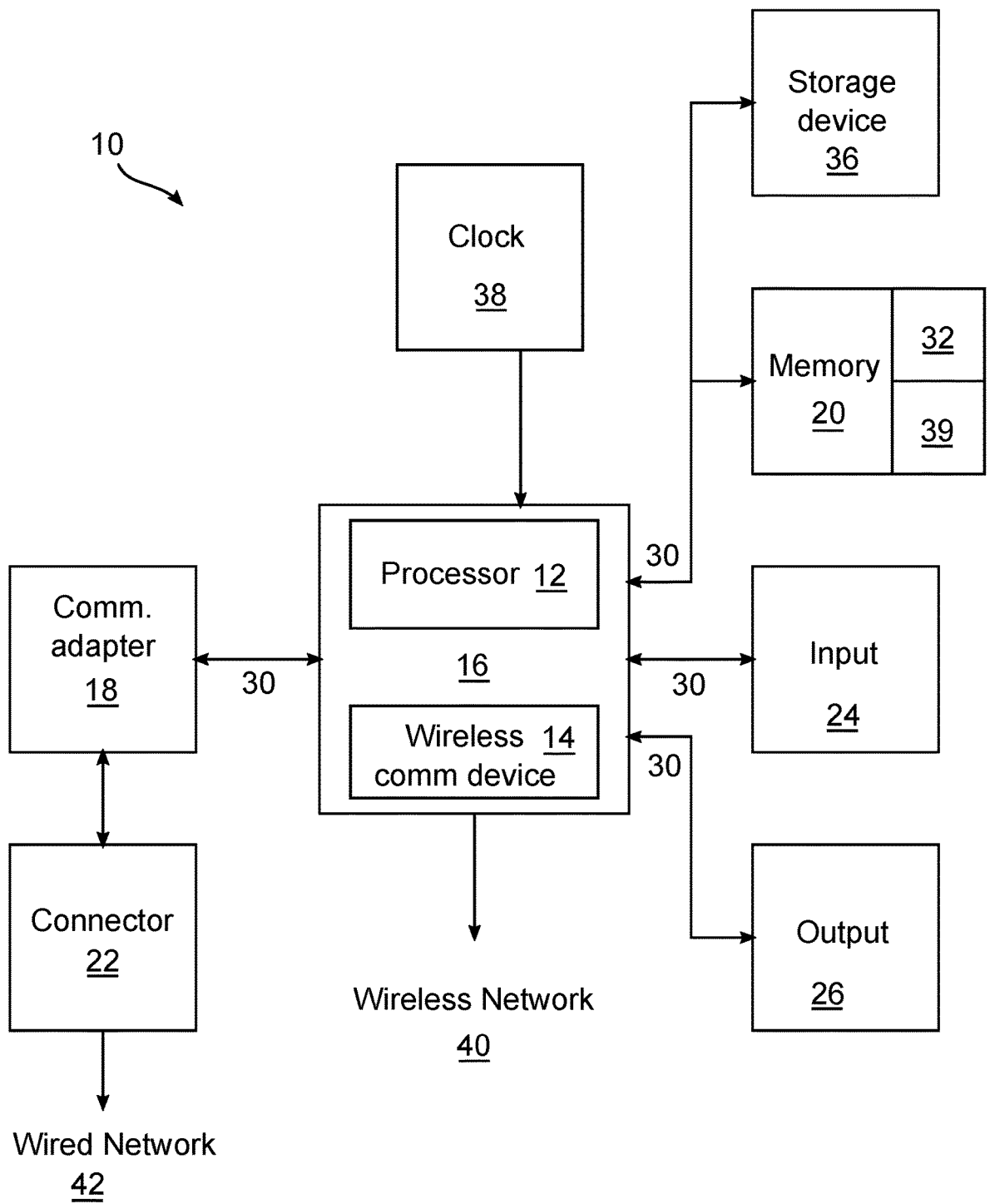
Figure 2:
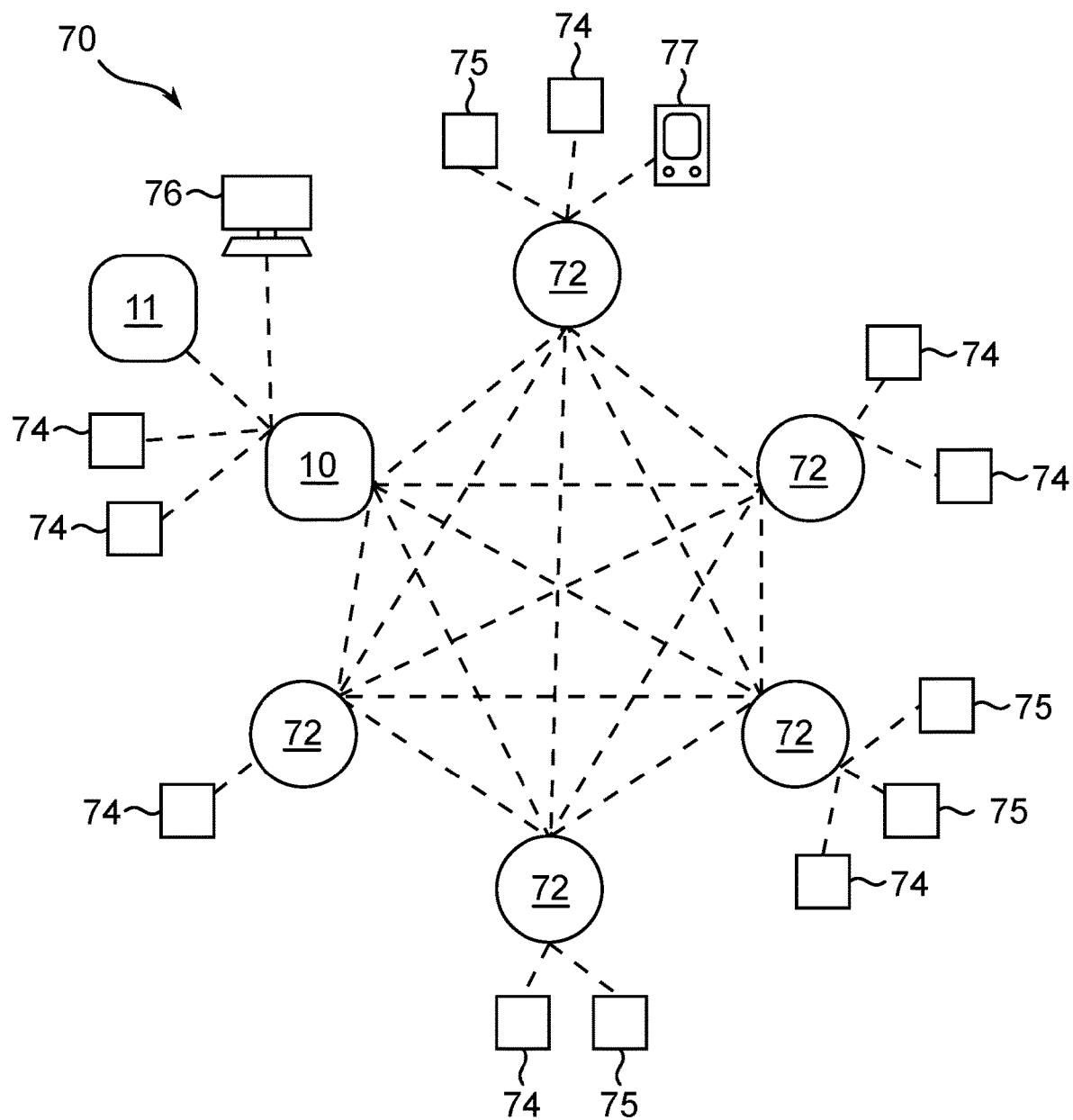
Figure 3:
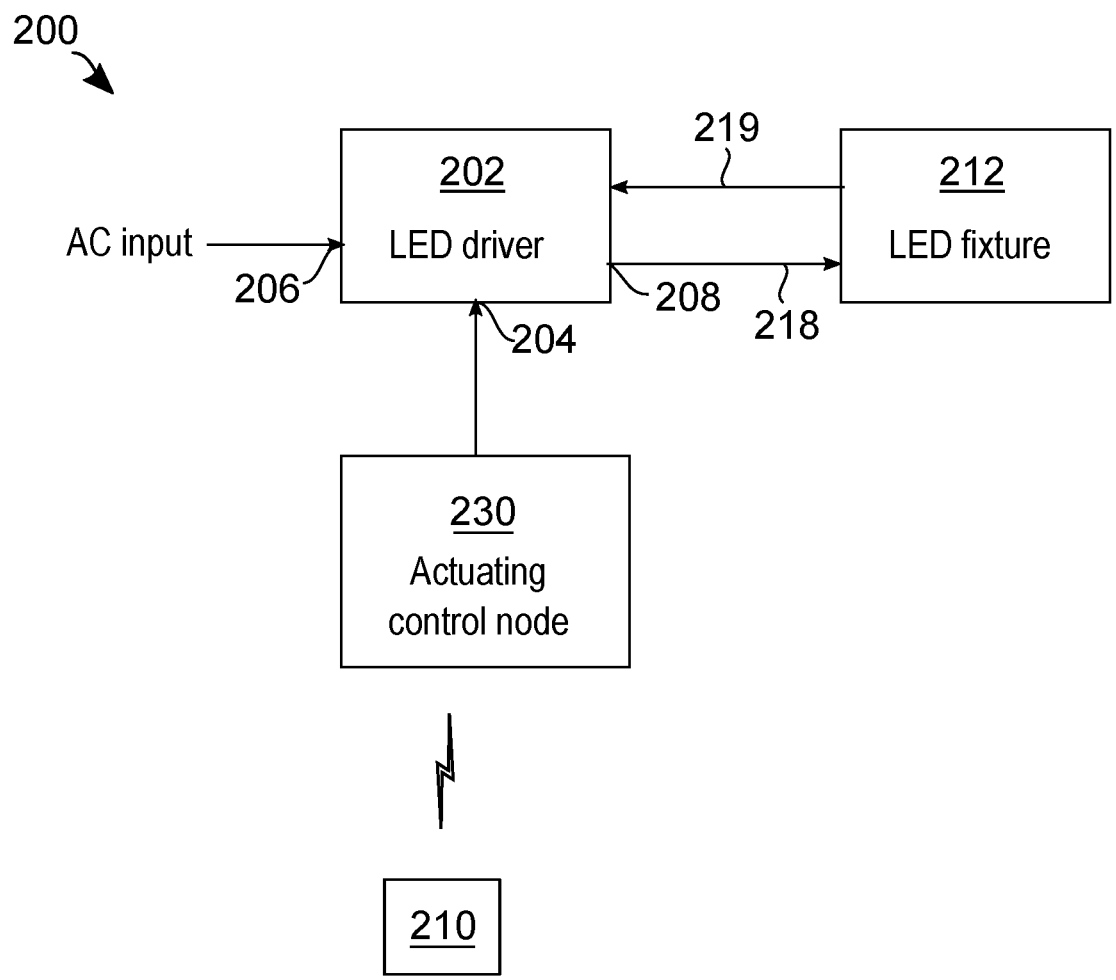

Various other objects, features and advantages of the invention will be readily apparent according to the following description exemplified by the drawings, which are shown by way of example only, wherein:

FIG. 1 illustrates an embodiment of a gateway that retransmits a message when a prior message is not executed;

FIG. 2 illustrates an embodiment of a network in which a message may be retransmitted when a prior message is not executed;

FIG. 3 illustrates an embodiment of an LED light fixture installation; and

Figure 4:
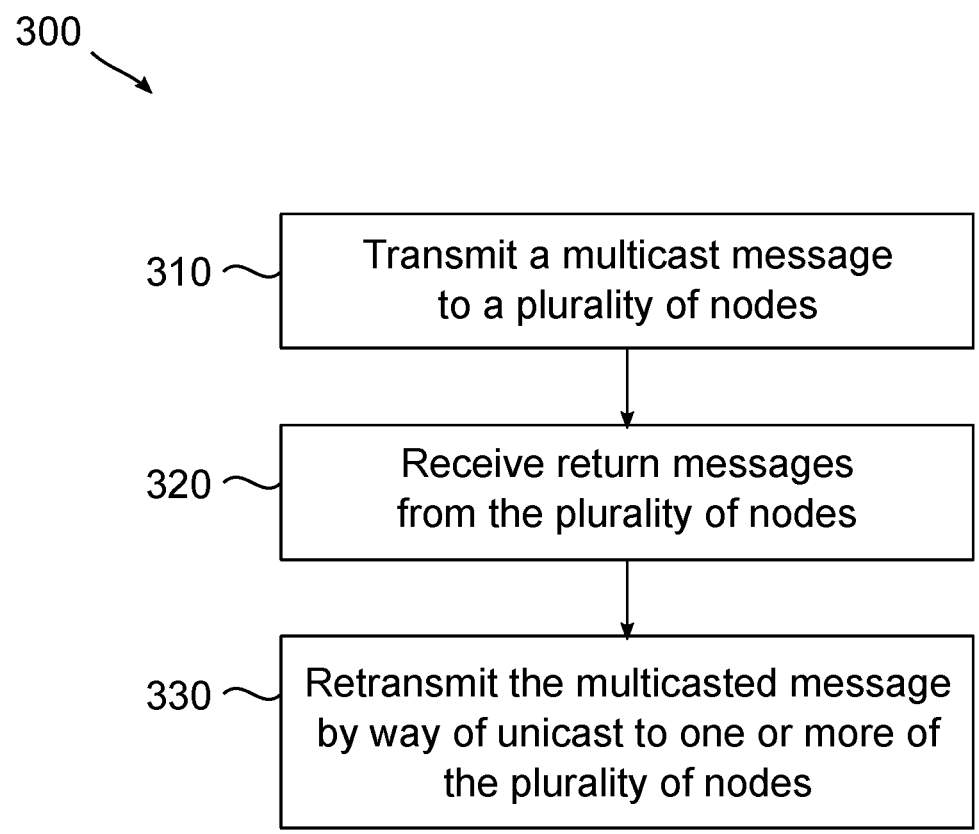

FIG. 4 illustrates an embodiment of a method of retransmitting a message; and

Figure 5:
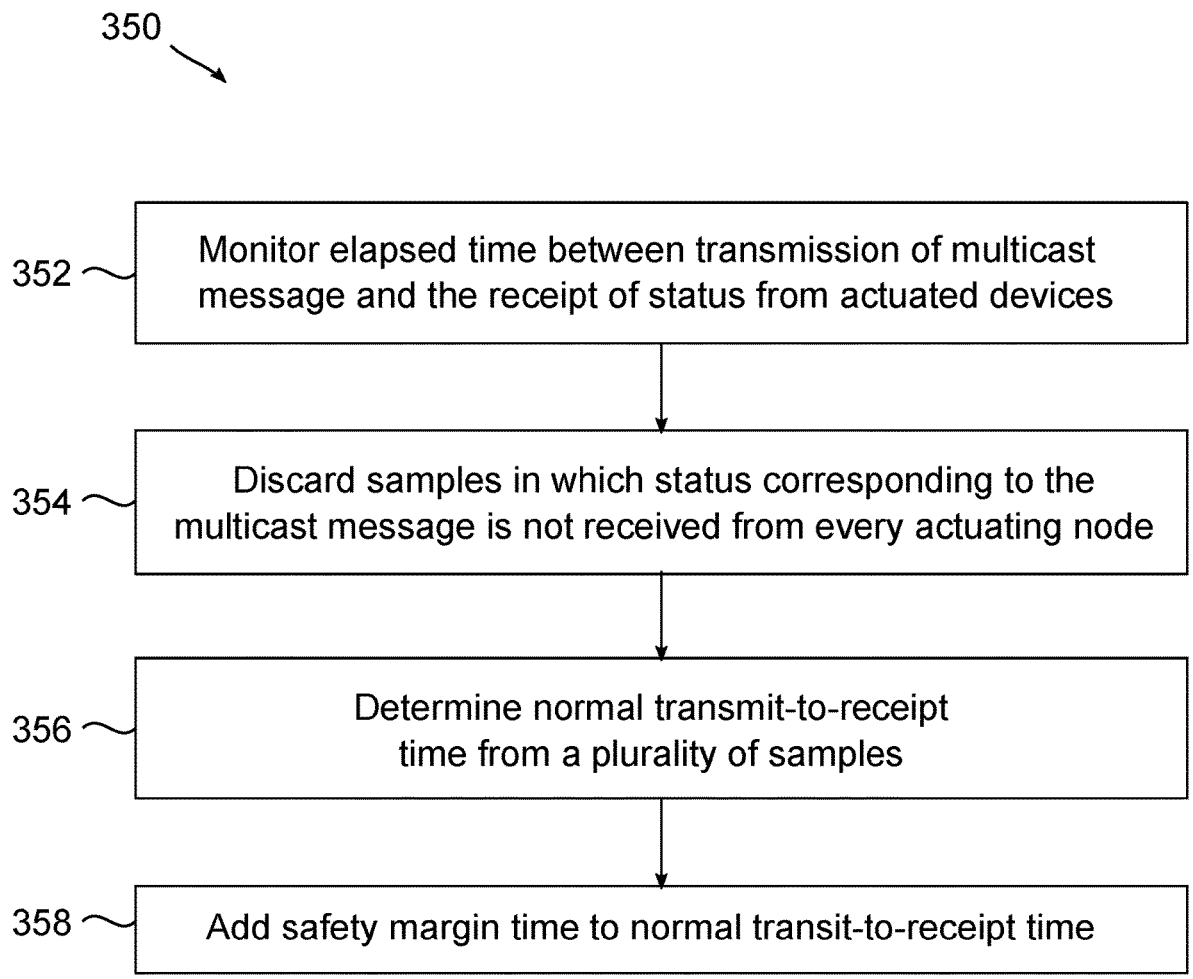

FIG. 5 illustrates an embodiment of a method of determining the amount of time to wait before retransmitting a message.

DETAILED DESCRIPTION OF THE INVENTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical radios.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term FIG. 1 illustrates an embodiment of a gateway 10 that performs an embodiment of retransmission of an unexecuted message. The gateway 10 includes a processor 12 and a wireless network communication device 14, which may be a ZigBee® network communication device. The processor 12 and wireless communication device 14 may be combined in a controller 16, which may be a microcontroller. The gateway 10 may also include a communication adaptor 18, memory 20, a communication adaptor port or connector 22, one or more input devices 24, diagnostic output devices 26, and a clock 38.

The gateway 10 may furthermore facilitate communications across networks including one or more wireless networks 40 and one or more wired networks 42.

It should be recognized that the gateway 10 may have fewer components or more components than shown in FIG. 1. For example, if an input device 24 or output device 26 is not desired, such a device may not be included in the gateway 10.

The elements, including the processor 12, memory 20, data storage device 36, output 26, input 24, and communication adaptor 18 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor" is intended to encompass instructions stored in a compressed or encrypted format, as well as instructions that may be compiled or installed by an installer before being executed by the processor 12.

The data storage device 36 may, for example, be non-volatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 36. Data from the data storage device 36 that is to be sent across the network 40 or 42 through the processor 12 may be sent in the form of messages in packets. Those messages may furthermore be queued in or by the processor 12. The data storage device 36 may not be necessary for operation of the gateway 10 in certain embodiments as data may be stored in memory, for example. Data may also be stored remotely and accessed over a network, such as the Internet.

The communication adaptor 18 permits communication between the gateway 10 and other gateways 11 (depicted in FIG. 2), routers 72 (depicted in FIG. 2), devices, or nodes coupled to the communication adaptor 18 at the communication adaptor connector 22. The communication adaptor 18 may be a network interface that transfers information from a node such as a router 72, a terminal device 74 or 75 (depicted in FIG. 2), a general purpose computer 76 (depicted in FIG. 2), a user interface 77 (depicted in FIG. 2) or another gateway 11 to the gateway 10 or from the gateway 10 to a node 11, 72, 74, or 76. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or more input or output devices such as, for example, one or more pushbuttons and diagnostic lights or displays. It will be recognized, however, that the gateway 10 does not necessarily need to have an input device 24 or an output device 26 to operate.

The processor 12 may include or be attached to the real-time clock 38 such that the processor 12 may read or retrieve scheduled events from the data storage device 36 when or subsequent to real-time clock 38 indication that the scheduled time has arrived. Those retrieved scheduled events may then be transmitted across the network 40 or 42. One or more of such scheduled events may trigger messages to be sent at a time or in a cycle and, where more than one message is triggered to be sent across the network 40 or 42, those messages may form a queue. The queue may be created at the microprocessor 16.

FIG. 2 illustrates a network 70 in an embodiment of dynamic virtual groups. The network 70 includes a gateway, such as the gateway 10 illustrated in FIG. 1, one or any desired number of additional gateways 11, one or more routers 72, a plurality of end devices 74 and 75, and one or more general purpose computers 76 and user interfaces 77. The additional gateways 11 may be like the gateway 10 illustrated in FIG. 1, or may be of various configurations. The end devices may be actuated devices 74 such as lighting fixtures, blinds, or various other devices that are controlled by or in the network 70 and sensors 75 such as manually operated switches, light level sensors, and other ambient condition sensors.

Messages to be transmitted across the network 40, 42, or 70 may enter one or more queues, such as a broadcast queue for messages to be transmitted to all devices on the network, a multicast queue for messages to be transmitted to more than one but not all devices on the network, and a unicast queue for messages to be transmitted to one device on the network. Each queue may be a packet queue where packets making up a message are queued for transmission across the network 40, 42, or 70. Messages or packets may be placed in that queue by the processor 12. Those messages and packets to be transmitted across the network may furthermore come from different places or processor 12 functions including scheduled events read from the data storage device 36 by the processor 12 and events or data created by the processor from, for example, sensed data received from a sensor 75 coupled to the network 40, 42, or 70.

The messages transmitted across the network 40, 42, or 70 may include data to be used by one or more of the receiving nodes 72, 74, or 75 or events to be actuated at one or more of the end device receiving nodes 72, 74, or 75 such as turning a light on or off, energizing a motor on a motorized window shade or blind, controlling lighting brightness, or controlling lighting color.

In an embodiment of queue operation, only as many as a predetermined number of messages are permitted to be transmitted across the network in a predetermined message transmission time period. The predetermined message transmission time period may, for example, be a single program cycle or another desired period of time. In an embodiment where more messages are to be sent than that predetermined number of messages, the additional messages are placed in the queue.

FIG. 3 illustrates an embodiment of an LED light fixture installation 200. The LED light fixture installation 200 of FIG. 3 includes an actuating control node 230, an LED driver 202, and an LED fixture 212. A manually operated switch 210 may furthermore be coupled to the actuating control node 230 by wire or wirelessly.

The LED driver 202 includes at least one signal input 204, a power input 206, and an LED power output 208. The LED driver 202 may be connected to the LED light fixture 212 input 218 at its LED power output 208 with a return wire 219.

In the embodiment illustrated in FIG. 3, the actuating control node 230 provides one or more signals or power to the LED driver 202 and the LED driver 202 provides appropriate power to the LED fixture 212 commensurate with the power and signals received at the LED driver 202 from the actuating control node 230.

In an embodiment, the LED driver 202 may be connected by wire directly to line alternating current at the power input 206 and may provide a constant current power output to the LED fixture 212 in accordance with one or more signals received at the LED driver 202 input 204 from the actuating control node 230.

The LED power output 208 may be a constant current output that is created from the line alternating current received at the LED power input 206 and that power may be provided to one or more LED fixtures 212, wherein each fixture 212 may contain one or more strings of LEDs. Those LEDs may furthermore be of different colors.

FIG. 4 illustrates a method of retransmitting a message 300. That embodiment of retransmitting a message 300 may be executed by the gateway 10 illustrated in and described in connection with FIG. 1. That method of retransmitting a message 300 may furthermore be performed on a network such as the network 70 illustrated in and described in connection with FIG. 2. In an embodiment, the method of retransmitting a message includes transmitting a multicast message to a plurality of nodes at 310, receiving return messages from the plurality of nodes at 320, and retransmitting the content of the multicast message as a unicast message to one or more of the plurality of nodes at 330. The message retransmission occurring at 330 may be by way of a unicast message to a single one of the plurality of nodes and may be by way of a unicast message transmitted to each of two or more of the plurality of nodes.

Transmission of a multicast message to a plurality of nodes at 310 may emanate from a first node on the network 72, which may, for example, be a gateway 10 in an Internet of Things network. That multicast message may, for example, be a message to energize or de-energize a plurality of lighting fixtures that are actuated by the plurality of nodes 74 on the network 70. Other multicast messages are also contemplated, including commands to the plurality of nodes 74 to adjust lighting brightness or color. A multicast message may also or alternately be transmitted to temperature control, fire alarm, or security system components.

Triggering of the multicast message transmitted to the plurality of nodes at 310 may be initiated by a scheduled event, a manual switch 210 or other control, an occupancy sensor or switch, a sensed or manually triggered underlit or overlit signal, or from a user command issued from a network device 77, for example.

The message receiving nodes 74 in the embodiment illustrated in FIG. 4 may or may not report receipt of the multicast message back to the multicast message transmitting device 72, but will actuate a physical device and report a status of the physical device to the multicast message transmitting device 72. The physical device status may be received at the message receiving actuating node 74 from a sensor that senses the current state or level of the actuated device. That level may be, for example, an intensity, a color or a modulated position of the physical device. The physical device status may alternately be determined from the last commanded state or level of the actuated device.

The retransmission of 330 of the message transmitted at 310 may occur where the status of the commanded device is not an expected status based on the content of the multicast message that was transmitted from the multicast transmitting node 72. For example, if the multicast message commanded lighting fixtures controlled by the plurality of receiving nodes 74 to be energized and one of the receiving nodes 74 reports a light de-energized status back to the multicast transmitting node 72, the status of the commanded device would not be the expected state. In such a circumstance of mismatching command and status, the multicast transmitting node 72 will assume that the multicast message it sent did not reach the actuating node 74 with the mismatching status and the multicast transmitting node 72 will retransmit the message to the actuating node 74, 75 with the mismatching status.

Because the network bandwidth associated with multicast messages may be significantly larger than the network bandwidth associated with unicast messages, the retransmission to the actuating node 74 with the mismatched status is likely to be performed with a unicast message, but other forms of messages may alternately be used for retransmission of a message.

The method 300 of FIG. 4 may beneficially be employed in a building control network of control nodes. In such a building control network, which may be similar to the network 70 illustrated in FIG. 2, the network 70 may be divided into building zones. A building zone may be a floor, a space leased by a tenant, an area in which a particular business function is performed, or any other natural building division. The zones may be established by a user, by a lighting control professional, from architectural drawings, by an automated method that divides a building or space in a building into building zones, or otherwise as desired. For example, a user may create zoned spaces in the building graphically on computer generated floor plan diagrams or otherwise.

Moreover, a plurality of remote devices or nodes that is multicast with a common message or command may actuate similar devices in such a building zone. Thus, for example, where a building zone has a dozen lighting fixtures that are controlled by eight networked nodes, a multicast message may be transmitted to those eight nodes to energize all those fixtures and command all those fixtures to a desired color and illumination level.

Each multicast transmitting node 72 may be responsible for one or more building zones. Each of those building zones may contain a plurality of actuating nodes that are coupled to actuate one or more devices, such as lighting fixtures. In that way, for example, part or all of a building zone may be commanded with a multicast message sent from the multicast transmitting node 72 to the affected actuating nodes 74. Thus, for example, part or an entire building zone of lighting fixtures may be commanded on to a desired brightness using one or more multicast messages. If one or more devices of the actuating nodes 74 does not indicate that its lighting fixture or fixtures is on at the commanded intensity a predetermined time after the multicast message was sent, the multicast transmitting node 72 may retransmit one or more unicast messages to the actuating nodes 74 that do not report a status of the lighting fixture or fixtures that it controls that matches the commanded status.

FIG. 5 illustrates a method of determining an amount of time for a transmitting node 72 to wait for actuating node 74 status reports before retransmitting a message 350, referred to herein as a retransmission wait time. In that method 350, at 352, the transmitting node 72 monitors the amount of time that elapses from the time it sends a multicast message to the actuating nodes 74 to the time when the transmitting node 72 receives the status of the actuated devices from the actuating nodes 74. The transmitting node 72 may furthermore only accept statuses that correspond to one or more commands that were included in the multicast message.

At 352, the multicast transmitting node 72 may determine an amount of time that elapsed from the time that transmitting node 72 transmitted the multicast message to the plurality of actuating nodes 74 to the time when the transmitting node has received a status of from each of the actuated devices, transmitted from the plurality of actuating nodes, that corresponds to the multicast message.

At 354, if the multicast transmitting node 72 does not receive a status that corresponds to the command from every actuating node 74 commanded in the multicast message within a predetermined amount of time, for example 30 seconds, the multicast transmitting node 72 may assume the message was not received by every actuating node 74 and discard that sample. The multicast transmitting node 72 may thus discard any time sample in which all target devices do not provide a status that corresponds to the multicast message within the predetermined time.

At 356, the multicast transmitting node 72 may sample a plurality of command transmission and status receipt samples from 354 to determine a normal time that it takes for a message to be received by all receiving nodes 74 and current status to be returned, and reject samples where all actuating nodes 74 did not provide the proper status. That normal time may then be determined to be, for example, the average time it takes to receive corresponding statuses from all receiving nodes 74, a maximum time it took to receive corresponding statuses from all receiving nodes 74, or another desired sampling standard.

At 358, the multicast transmitting node 72 may add a predetermined safety margin amount of time to the normal time determined from the samples at 356 and select an amount of time to wait from transmission of a command message to a time when retransmission of that message should be performed. For example, the predetermined safety margin amount of time that is added to the normal time to create a retransmission wait time may be two seconds. Furthermore, where the normal time determined from the samples is an average time it takes to receive corresponding statuses from all receiving nodes 74, the predetermined safety margin amount of time may be added to that average, normal time to determine the waiting time from transmission to retransmission. Of course, retransmission may only occur when statuses corresponding to the transmitted command do not indicate that the transmitted command was executed by a receiving node 74. In another embodiment where the maximum time from transmission to receipt of corresponding statuses from all receiving nodes 74 is used, no safety margin may be applied to the wait time.

The method of determining a retransmission wait time 350 may be determined for an entire network with samples from various multicast transmitting nodes being considered to create the retransmission wait time or retransmission wait times may be created on a zone basis where each multicast transmitting node 72 retains its own retransmission wait time. Other groupings of transmitting nodes 72 may alternately share a retransmission wait time as desired by the network administrator.

The method of determining a retransmission wait time 350 of FIG. 5 may be recalculated as desired. For Example, retransmission wait times may be determined at regular times, such as daily or weekly, may be performed when new devices are added to the network or the zone, or may be determined at any desired interval or the occurrence of an event.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalent.

What is claimed is:

1. A message retransmission apparatus, comprising:
   a network communication device for communicating data to a plurality of remote devices; and
   a processor coupled to the network communication device, the processor including instructions which, when executed by the processor, cause the processor to:
      transmit a first multicast message to a plurality of nodes;
      receive return status messages from the plurality of nodes for a predetermined period of time;
      determine an amount of time that elapses from a time a second multicast message is sent to the time when all of the plurality of nodes the multicast message was sent to transmit a status that corresponds to the multicast message; and
      retransmit substantive content of the first multicast message by unicast to at least one of the plurality of nodes, that node having not provided a status that corresponds with the first multicast message after the determined time.

2. The message retransmission apparatus of claim 1, wherein the retransmission apparatus is a gateway coupled to a network.

3. The message retransmission apparatus of claim 1, wherein the plurality of nodes to which the multicast message is transmitted are actuating nodes that actuate a device.

4. The message retransmission apparatus of claim 3, wherein the actuating nodes actuate building control devices.

5. The message retransmission apparatus of claim 4, wherein at least one of the plurality of nodes to which the multicast message is transmitted is an actuating node that actuates a binary state change.

6. The message retransmission apparatus of claim 5, wherein the at least one actuating node energizes and de-energizes a lighting fixture.

7. The message retransmission apparatus of claim 6, wherein the status is one of the energized and de-energized state of the lighting fixture.

8. The message retransmission apparatus of claim 4, wherein at least one of the plurality of nodes to which the multicast message is transmitted is an actuating node that modulates a device.

9. The message retransmission apparatus of claim 8, wherein the at least one actuating node modulates at least one of an intensity and a color of a lighting fixture.

10. The message retransmission apparatus of claim 9, wherein the status is one of the intensity and the color of the lighting fixture.

11. The message retransmission apparatus of claim 3, wherein the retransmission apparatus monitors the amount of time that elapses from sending the multicast message to receipt of a status of the actuated devices from the actuating nodes that corresponds to the multicast message.

12. The message retransmission apparatus of claim 11, wherein the processor further includes instructions which, when executed by the processor, cause the processor to determine an amount of time that elapses from sending the multicast message to receipt of a status of the actuated devices from the plurality of actuating nodes that corresponds to the multicast message by measuring the time that elapses from the time the multicast message is sent to the time when all of the plurality of actuating nodes the multicast message was sent to transmit a status that corresponds to the multicast message.

13. The message retransmission apparatus of claim 12, wherein determining an amount of time that elapses from a time a second multicast message is sent to the time when all of the plurality of nodes the multicast message was sent to transmit a status that corresponds to the multicast message includes measuring the time that elapses from the time the second multicast message is sent to the time when all of the plurality of actuating nodes the second multicast message was sent to transmit a status that corresponds to the second multicast message for a plurality of multicast transmission samples.

14. The message retransmission apparatus of claim 13, wherein the processor further includes instructions which, when executed by the processor, cause the processor to discard any transmission samples in which all target devices do not provide a status that corresponds to the multicast message within a predetermined time.

15. The message retransmission apparatus of claim 14, wherein the processor further includes instructions which, when executed by the processor, cause the processor to select an amount of time to wait to send a retransmission that is equal to the maximum time measured in the transmission samples plus a predetermined amount of time.

16. The message retransmission apparatus of claim 15, wherein the processor further includes instructions which, when executed by the processor, cause the processor to additionally discard any transmission samples that do not report a status that corresponds to the multicast message within a predetermined amount of time.

17. A message retransmission method, comprising:
   transmission of a multicast message to a plurality of nodes by a network communication device;
   receipt by the network communication device of return status messages from the plurality of nodes during a predetermined period of time; and
   retransmission by the network communication device of the multicast message by unicast to at least one of the plurality of nodes, that node not having provided a state that corresponds with the command included in the multicast message within a predetermined amount of time that it has been determined through prior transmissions to take for the plurality of nodes to respond to the multicast message with a status.

18. The message retransmission apparatus of claim 17, wherein the plurality of nodes to which the multicast message is transmitted are actuating nodes that actuate a device.

19. An Internet of Things gateway, comprising:
   a network communication device for communicating data to a plurality of remote actuating devices that each actuate a building control device; and
   a processor coupled to the network communication device, the processor including instructions which, when executed by the processor, cause the processor to:
      transmit a multicast message to at least some of the plurality of remote actuating devices;
      receive return status messages from the plurality of remote actuating devices during a predetermined period of time that it has been determined to take the plurality of remote actuating devices to respond to previously transmitted multicast messages with a status; and
      retransmit the message that was multicast by unicast to at least one of the plurality of remote actuating devices, that remote actuating device having one of provided a status that does not correspond with a command included in the multicast message and not provided a status within the predetermined period of time.

20. The Internet of Things gateway of claim 19, wherein the gateway monitors the amount of time that elapses from sending the multicast message to receipt of a status of the actuated devices from the remote actuating nodes that corresponds to the multicast message.

* * * * *